United States Patent
Iijima (10) Patent No.: US 8,154,624 B2
(45) Date of Patent: Apr. 10, 2012

(54) IMAGE PICKUP APPARATUS AND CONTROL METHOD THEREOF

(75) Inventor: Ryunosuke Iijima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 527 days.

(21) Appl. No.: 12/337,893

(22) Filed: Dec. 18, 2008

(65) Prior Publication Data
US 2009/0167898 A1 Jul. 2, 2009

(30) Foreign Application Priority Data
Dec. 28, 2007 (JP) ................................ 2007-338411

(51) Int. Cl.
*H04N 5/262* (2006.01)
(52) U.S. Cl. ................ 348/240.1; 348/240.2; 348/240.3
(58) Field of Classification Search ............... 348/240.1, 348/240.2, 240.3, E05.055, 240.99
See application file for complete search history.

(56) References Cited

U.S. PATENT DOCUMENTS

| | | | | |
|---|---|---|---|---|
| 5,420,632 | A * | 5/1995 | Yamagiwa | 348/240.3 |
| 6,215,959 | B1 * | 4/2001 | Mori et al. | 396/91 |
| 6,822,688 | B2 * | 11/2004 | Ohta | 348/349 |
| 6,947,074 | B2 | 9/2005 | Koseki et al. | |
| 7,269,344 | B2 * | 9/2007 | Nishioka et al. | 396/60 |
| 7,697,218 | B2 * | 4/2010 | Ishikawa et al. | 359/697 |
| 7,710,661 | B2 * | 5/2010 | Iwasaki | 359/697 |
| 2008/0152334 | A1 * | 6/2008 | Choi et al. | 396/97 |

FOREIGN PATENT DOCUMENTS
JP 2002-314868 10/2002

* cited by examiner

*Primary Examiner* — Tuan Ho
*Assistant Examiner* — Shahbaz Nazrul
(74) *Attorney, Agent, or Firm* — Cowan, Liebowitz & Latman, P.C.

(57) ABSTRACT

An image pickup apparatus that has an optical zooming unit and an electronic zooming unit includes a temperature detector configured to detect a temperature of the image pickup apparatus, and a controller configured to move the electronic zooming unit along with an operation of the optical zooming unit, and to move a telephoto end for control of the optical zooming unit toward a wide-angle side according to the temperature detected by the temperature detector. Along with control to move the telephoto end of the optical zooming unit to the wide-angle end, the controller sets smaller than a change rate of a zoom magnification of an electronic zooming unit in a first zoom region a change rate of a zoom magnification of an electronic zooming unit in a second zoom region that is adjacent with and closer to the telephoto end than the first zoom region.

5 Claims, 5 Drawing Sheets

PRIOR ART

IMAGE PICKUP APPARATUS AND CONTROL METHOD THEREOF

BACKGROUND OF THE INVENTION

1. Field of the Invention

The present invention relates to an image pickup apparatus, such as a video camera and a digital still camera, and more particularly to an image pickup apparatus that provides electronic zooming accompanying with optical zooming.

2. Description of the Related Art

An image pickup apparatus, such as a video camera, has an optical zoom function that provides a magnification variation by moving a magnification-varying lens in an optical system, and an electronic (or digital) zoom function that provides an electronic magnification variation by using an original image generated through a photoelectric conversion of a subject image. A combination of the optical zoom function and the electronic zoom function can provide an extremely high zoom magnification.

Figure 6:
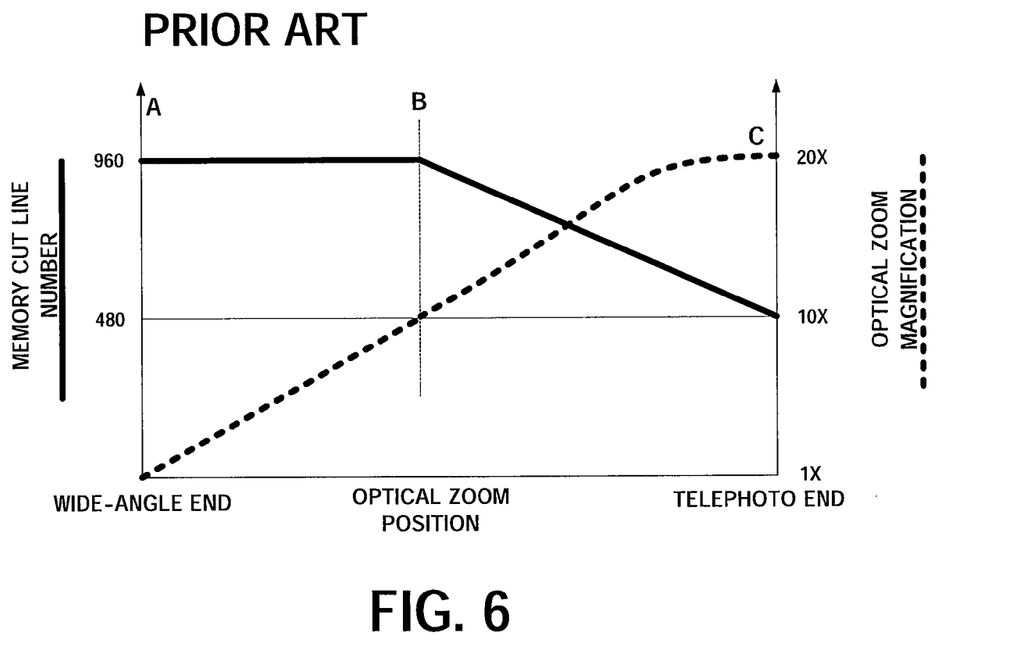
FIG. 6 is a view showing a relationship between an optical zoom magnification and an electronic zoom magnification (or memory cut line number) in a conventional video camera.

Moreover, among this type of image pickup apparatus, there is one that can have a zoom function that changes an electronic zoom magnification along with (or in connection with) a change of an optical zoom magnification, which will be referred to as an "optical/electronic synthesis zoom function" hereinafter. See Japanese Patent FIG. 6 shows a change of a memory cut line number that is the number of cutout pixel lines from the original image to a change of an optical zoom magnification in a conventional optical/electronic synthesis zoom function. A solid line denotes the memory cut line number corresponding to the electronic zoom magnification. As the memory cut line number is smaller, an electronic zoom magnification becomes higher. In addition, a dotted line denotes an optical zoom magnification.

In a wide-angle-side zoom region from a magnification A (wide-angle end) to a magnification B, the memory cut line number (or electronic zoom magnification) is fixed to a constant value so as to provide only the optical zooming. On the other hand, in a telephoto-side zoom region from the magnification B to a magnification C (telephoto end), the electronic zooming works along with (or accompanies with) the optical zooming. More specifically, by linearly increasing the electronic zoom magnification from the magnification B to the magnification C, an image having a higher enlargement ratio is available than that used with only the optical zooming.

Moreover, in the telephoto-side zoom region, the optical zooming is performed so as to decrease a change rate of the optical zoom magnification for a position closer to the telephoto end. This is because the control can enable a movement of a focus lens configured to correct image surface fluctuations caused by the optical zooming to follow the zooming.

However, as the temperature of the video camera (in particular, a barrel part that accommodates the optical system) rises, a position of a lens in the optical system changes due to a deformation (stretch or retraction of the barrel part), and may make the focal length of the optical system longer. In this case, when the electronic zoom magnification is linearly increased from the magnification B to the magnification C in the telephoto-end zoom region, as shown in FIG. 6, a problem occurs in which a change of an angle of view is conspicuous due to the electronic zooming.

SUMMARY OF THE INVENTION

The present invention is directed to an image pickup apparatus that has an optical/electronic synthesis zoom function and makes a change of angle of view cause by the electronic zooming inconspicuous even when the temperature rises.

An image pickup apparatus according one aspect of the present invention includes an optical zooming unit configured to provide an optical magnification variation, an electronic zooming unit configured to provide an electronic magnification variation, a temperature detector configured to detect a temperature of the image pickup apparatus, and a controller configured to move the electronic zooming unit along with an operation of the optical zooming unit, and to move a telephoto end for control of the optical zooming unit to a wide-angle side according to the temperature detected by the temperature detector, wherein along with control to move the telephoto end of the optical zooming unit to the wide-angle end, the controller sets smaller than a change rate of a zoom magnification of an electronic zooming unit in a first zoom region a change rate of a zoom magnification of an electronic zooming unit in a second zoom region that is adjacent with and closer to the telephoto end than the first zoom region.

An image pickup apparatus according to another aspect of the present invention includes an optical zooming unit configured to provide an optical magnification variation, an electronic zooming unit configured to provide an electronic magnification variation, a temperature detector configured to detect a temperature of the image pickup apparatus, and a controller configured to move the electronic zooming unit along with an operation of the optical zooming unit in a first zoom region, and to move a telephoto end for control of the optical zooming unit in a second zoom region in the first zoom region toward a wide-angle side according to a temperature detected by the temperature detector, wherein the controller sets a zoom magnification of an electronic zooming unit at a first temperature, which operates along with the operation of the optical zooming unit in the second zoom region, to be smaller than a zoom magnification of an electronic zooming unit at a second temperature higher than a first temperature.

A control method according to another aspect of the present invention of an image pickup apparatus that includes an optical zooming unit configured to provide an optical magnification variation, and an electronic zooming unit configured to provide an electronic magnification variation includes a first step of detecting a temperature of the image pickup apparatus, and a second step of moving the electronic zooming unit along with an operation of the optical zooming unit in a first zoom region, and to move a telephoto end for control of the optical zooming unit in a second zoom region in the first zoom region toward a wide-angle side according to the temperature detected by the temperature detector, wherein along with control to move the telephoto end of the optical zooming unit to the wide-angle end, the second step sets smaller than a change rate of a zoom magnification of an electronic zooming unit in a first zoom region a change rate of a zoom magnification of an electronic zooming unit in a second zoom region that is adjacent with and closer to the telephoto end than the first zoom region.

A control method according to another aspect of the present invention of an image pickup apparatus that includes an optical zooming unit configured to provide an optical magnification variation, and an electronic zooming unit configured to provide an electronic magnification variation includes a first step of detecting a temperature of the image pickup apparatus, and a second step of moving the electronic zooming unit along with an operation of the optical zooming unit in a first zoom region, and to move a telephoto end for control of the optical zooming unit in a second zoom region in the first zoom region toward a wide-angle side according to the temperature detected by the temperature detector, wherein the second step sets a zoom magnification of an electronic zooming unit at a first temperature, which operates along with the operation of the optical zooming unit in the second zoom region, to be smaller than a zoom magnification of an electronic zooming unit at a second temperature higher than a first temperature.

Further features of the present invention will become apparent from the following description of exemplary embodiments with reference to the attached drawings.

DESCRIPTION OF THE EMBODIMENTS

Referring now the accompanying drawings, a description will be given of preferred embodiments of the present invention.

First Embodiment

Figure 1:
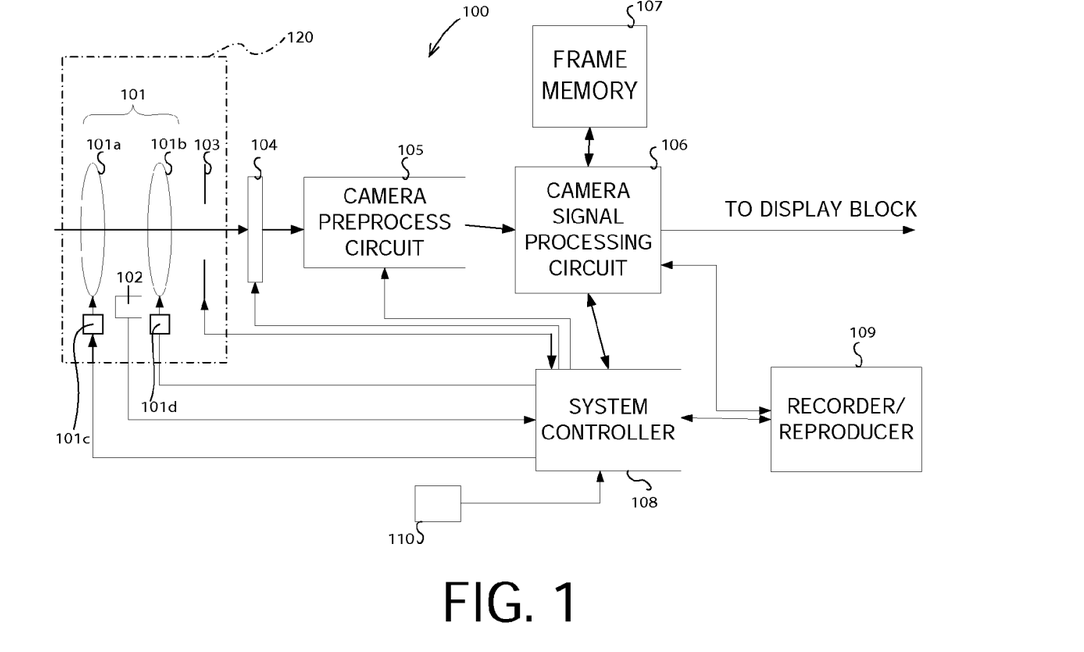
FIG. 1 is a block diagram showing a structure of a video camera according to a first embodiment of the present invention.

FIG. 1 shows a structure of a video camera 100 as an image pickup apparatus according to a first embodiment of the present invention. In the figure, 101 denotes an optical system that includes a magnification-varying lens 101a, a focus lens 101b, and actuators 101c and 101d each configured to move the magnification-varying lens 101a or focus lens 101b for an optical magnification variation and focus control. An optical zooming unit includes the magnification-varying lens 101a and the actuator 101c configured to move it. A magnification variation performed by a movement of the magnification-varying lens 101a will be referred to as "optical zooming." In addition, a zoom magnification of the optical system 101 obtained by the optical zooming will be referred to as an "optical zoom magnification."

102 denotes a temperature sensor or detector configured to detect a temperature of the video camera 100, more specifically, a temperature of a lens barrel part 120 that accommodates the optical system 101.

A stop 103 adjusts a light quantity from a subject after the light passes the optical system 101, and the resultant light forms a subject image on an image pickup surface of the image sensor 104, such as a CCD sensor and a CMOS sensor. The subject image is converted into an electric signal by a photoelectric conversion operation of the image sensor 104. The photoelectrically converted signal is read out from the image sensor 104 based on a reference clock signal, sampled and held in a camera preprocessing circuit 105, properly gain-controlled by a system controller 108, and then A/D converted.

The camera signal processing circuit 106 performs various processes for the signal that has been converted into a digital signal, and generates an image or video signal as image data (original image). A frame memory 107 is used to temporally store the image data that will be used for the camera signal processing circuit 106.

Figure 2:
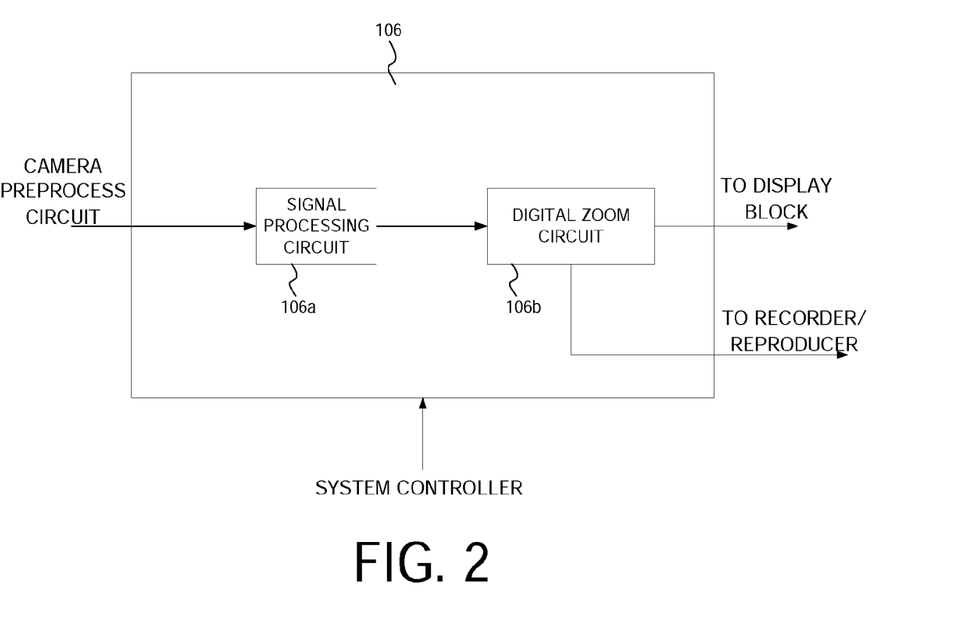
FIG. 2 is a block diagram showing a structure of a camera signal processing circuit of the video camera according to the first embodiment.

FIG. 2 shows the structure of the camera signal processing circuit 106. An image signal input from the camera preprocess circuit 105 is processed by a signal processing circuit 106a, and input into a digital zooming circuit 106b as the electronic zooming unit so as to undergo an electric enlargement or reduction process. More specifically, the digital zooming circuit 106b reads the original image (image signal) from the frame memory 107. Next, an area of the pixel line number (which will be referred to as a "memory cut line number" hereinafter) is cut out from the original image, and the cutout image is enlarged or reduced into an image having a predetermined number of pixels for recording or display. Thereby, the electronic zooming is performed as an electronic magnification variation for the original image.

The image signal that has undergone the enlargement/reduction process is transferred to a display block, and displayed on the LCD panel or electronic view finder ("EVF"). In addition, the image signal is sent to a recorder/reproducer 109 shown in FIG. 1, and recorded in a recording medium, such as a semiconductor memory, an optical disc, and a magnetic tape. The recorder/reproducer 109 also serves to read the image signal that has been recorded in the recording medium, and enables it to be displayed on the display block.

The frame memory 107 is used to temporally store the image data that will be used for the camera signal processing circuit 106.

The system controller 108 controls as a controller the whole operation of the video camera. A zoom switch 110 is manipulated by a user, and outputs a signal that designates (optical and electronic) zooming. The system controller 108 determines an optical zoom magnification (or a position of the magnification-varying lens 101a) or an electronic zoom magnification (or the memory cut line number) for the digital zooming circuit 106b, according to a signal from the zoom switch 110. Further, the system controller 108 sends the information to the optical system 101 (including the magnification-varying lens 101a and the actuator 101c) and the digital zooming circuit 106b, and controls the optical zooming and electronic zooming.

Figure 3:
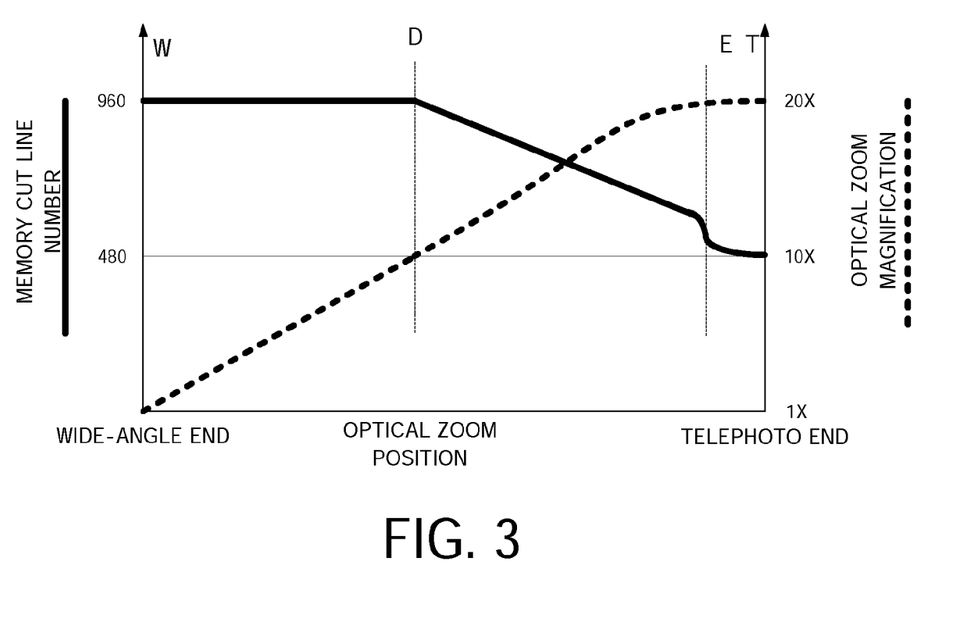
FIG. 3 is a view showing a relationship between an optical zoom magnification and an electronic zoom magnification (or memory cut line number) in the video camera according to the first embodiment.

FIG. 3 shows a relationship between the optical zoom magnification and the memory cut line number when the system controller 108 controls zooming. In this figure, a solid line and an ordinate axis at the left side denote the memory cut line number, and a dotted line and the ordinate axis at the right side denote the optical zoom magnification. As the memory cut line number is smaller, the electronic zoom magnification becomes higher. The abscissa axis denotes a position of the magnification-varying lens 101a, which is shown as an optical zoom position in the figure.

Figure 4:
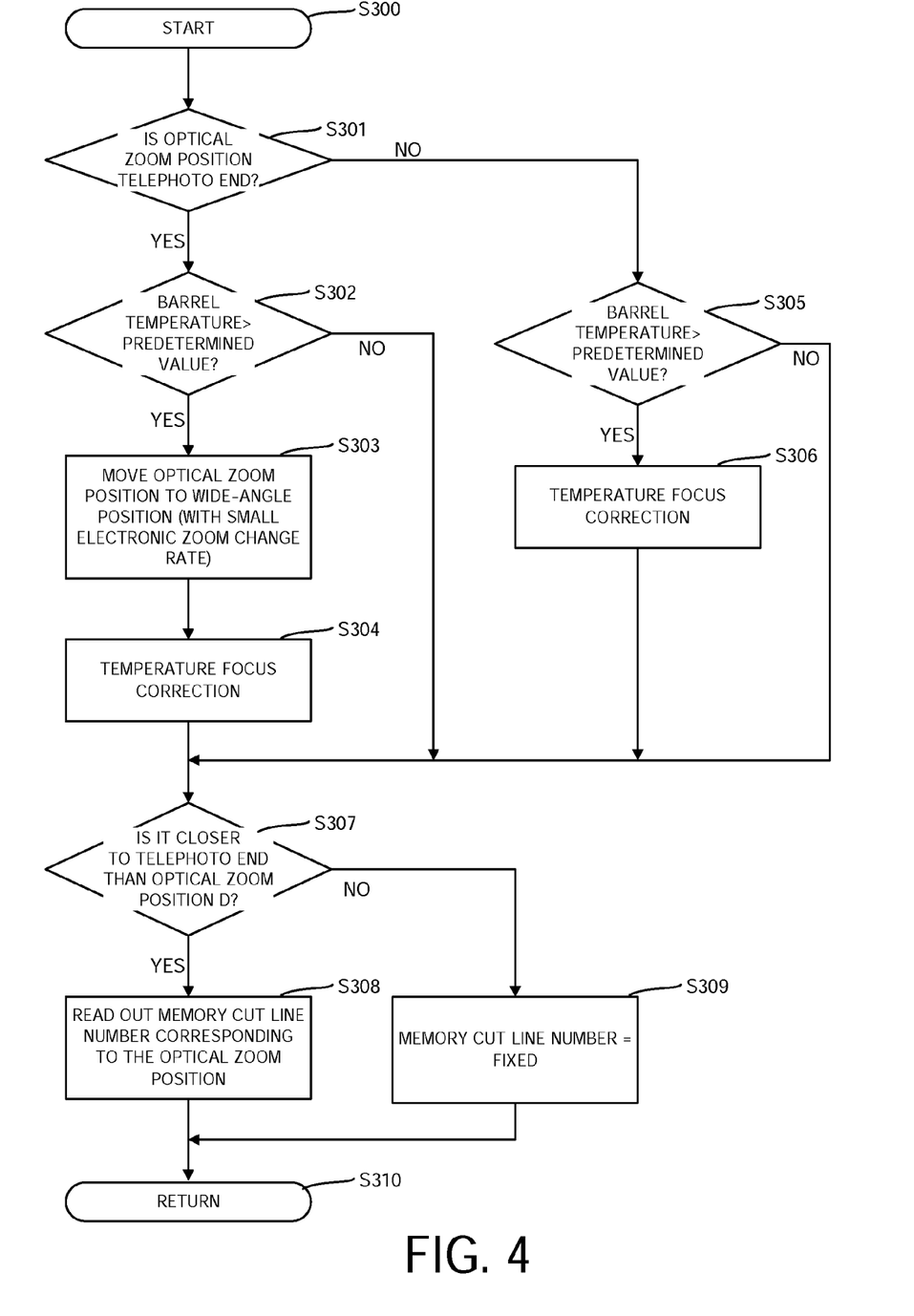
FIG. 4 is a flowchart showing an operation of the video camera according to the first embodiment.

In the actual zoom control, the system controller 108 refers to table data shown in FIG. 4 which indicates a relationship between the optical zoom position and the memory cut line number, and determines the memory cut line number corresponding to the optical zoom position detected by the lens position detector (not shown). However, the memory cut line number may be calculated with an operational equation that uses the optical zoom position as a parameter without using the table data.

In FIG. 3, the magnification variation by the optical zooming is performed while the memory cut line number (or the electronic zoom magnification) is fixed to a constant value in a zoom region from a wide-angle end W to an optical zooming position D (which will be referred to as a "wide-angle-side zoom region" hereinafter). In other words, in the wide-angle-side zoom region, the electronic zooming is not performed and only the optical zooming is performed.

The electronic zooming is performed along with the optical zooming in a zoom region (at the telephoto end side) from the optical zoom position D to an adjacent telephoto end T for control beyond an optical zoom position E (which will be referred to as a "first zoom region" or "telephoto-side zoom region" hereinafter). In other words, as the magnification-varying lens 101a moves and the optical zoom magnification increases, the memory cut line number is gradually decreased and the electronic zoom magnification is increased. In other words, this is an optical/electronic synthesis zoom control that provides the electronic zooming along with the optical zooming.

However, in a zoom region from the optical zoom position E to the telephoto end T for control (which will be referred to as a "second zoom region" or "telephoto-end neighboring zoom region" hereinafter), the memory cut line number is controlled as follows:

In the telephoto-end neighboring zoom region, a reduction rate of the memory cut line number cause by an increase of the optical zoom magnification is set to be smaller than a reduction rate of the memory cut line number in the zoom area (which will be referred to as a "zoom area D-E" hereinafter) other than the telephoto-end neighboring zoom region within the telephoto-side zoom region. In other words, in the telephoto-end neighboring zoom region, the change rate of the electronic zoom magnification in the electronic zooming along with the optical zooming is set to be smaller than the change rate of the electronic zoom magnification in the zoom area D-E. More specifically, the electronic zoom magnification in the telephoto-end zoom region is set so that it changes little. The zoom region D-E corresponds to the zoom region other than the second region within the first zoom region.

The system controller 108 moves the magnification-varying lens 101a to the wide-angle side in the telephoto-end neighboring zoom region, when the temperature of the lens barrel part 120 detected by the temperature sensor 102 is higher than the predetermined value and the magnification-varying lens 101a is located at the telephoto end. In other words, when the temperature of the lens barrel part 120 is the second temperature higher than the first temperature (predetermined value), the magnification-varying lens 101a is moved from the telephoto end to the wide-angle side.

This weighs a phenomenon in which the lens barrel part 120 extends in the optical-axis direction as the temperature rises, and a substantial focal length at the telephoto end for control becomes longer. Therefore, the focal length becomes longer even for the same telephoto end for control. The focus control cannot follow the extending focal length. In order to prevent this problem and the defocus state, the telephoto end for control is moved to the wide-angle side along with the temperature rise (the temperature zoom correction operation according to the temperature).

Thus, the telephoto-end neighboring zoom region is a zoom region in which the optical/electronic synthesis control is performed, and the magnification-varying lens 101a is moved for the temperature zoom correction.

By reducing a change rate of the electronic zoom magnification in the telephoto-end neighboring zoom region, the electronic zoom magnification does not significantly change and a change of the angle of view can be made inconspicuous even when the magnification-varying lens 101a moves from the telephoto end to the wide-angle side. The "angle of view," as used herein, means an angle of view of an image recorded in the recording medium by the recorder/reproducer or an image to be displayed on the display block.

A change of the angle of view caused when the magnification-varying lens 101a is moved to the wide-angle side is cancelled out when the lens barrel part 120 itself extends and the angle of view changes to the telephoto side. Therefore, a change of the angle of view can be made small by restraining a change of the electronic zoom magnification.

FIG. 4 shows a flowchart of zoom control executed by the system controller 108. This control is implemented in accordance with a computer program stored in the system controller 108.

When the control begins with the step (which is abbreviated as "S" in the figure) 300, the system controller 108 determines whether or not the optical zoom position (or the position of the magnification-varying lens 101a) is the telephoto end in the step 301. When the optical zoom position is the telephoto end, the flow proceeds to the step 302, and when it is not the telephoto end, the flow proceeds to the step 305.

In the step 302, the system controller 108 determines whether the temperature of the lens barrel part 120 (which will be referred to as a "barrel temperature" hereinafter) detected by the temperature sensor 102 is the second temperature that is higher than the predetermined value as the first temperature. When the barrel temperature is higher than the predetermined value, the flow proceeds to the step 303 so as to move the magnification-varying lens 101a to the optical zoom position at the wide-angle side which provides full range focusing. At this time, the electronic zooming moves to the wide-angle side, but the change rate of the electronic zoom magnification (the memory cut line number) set for the telephoto-end neighboring zoom region shown in FIG. 3 is so small that a change of the angle of view is inconspicuous. Then, the flow proceeds to the step 304.

In the step 304, the system controller 108 moves the focus lens 101b in the optical system 101 through autofocus (AF) for focus corrections. Thereby, the temperature zoom correction at the telephoto end is completed. Then, the flow proceeds to the step 307. In addition, when the barrel temperature is lower than the predetermined temperature, the steps 303 and 304 are skipped and the flow proceeds to the step 307.

On the other hand, in the step 305, the system controller 108 determines whether or not the barrel temperature detected by the temperature sensor 102 is higher than the predetermined temperature. When the barrel temperature is higher than the predetermined value, the flow proceeds to the step 306 to move the focus lens 101b in the optical system 101 so as to correct the focusing through the AF. Thereby, the temperature zoom correction is completed at positions other than the telephoto end. Then, the flow proceeds to the step 307. When the barrel temperature is lower than the predetermined value, the flow proceeds to the step 307 by omitting the step 306.

In the step 307, the system controller 108 determines whether or not the current optical zoom position is closer to the telephoto end than the optical zoom position D shown in FIG. 3 or located within the telephoto-side zoom region. When the current optical zoom position is within the telephoto-side zoom region, the flow proceeds to the step 308, and when the current optical zoom position is outside the telephoto-side zoom region 8 (or within the wide-angle-side zoom region), the flow proceeds to the step 309.

In the step 308, the system controller 108 reads the memory cut line number corresponding to the current optical zoom position from the aforementioned table data. Thereafter, along with the optical zooming, the electronic zooming is performed according to the memory cut line number, which has been read out. Then, the flow proceeds to the step 309, and the process ends.

In the step 309, the system controller 108 fixes the memory cut line number to the predetermined value (which sin 960 in FIG. 3) irrespective of the optical zoom position. Thereafter, even when the optical zooming is performed, the electronic zooming is not performed (where the electronic zoom magnification is being fixed). Thereafter, the flow proceeds to the step 309, and the process ends.

Figure 5A:
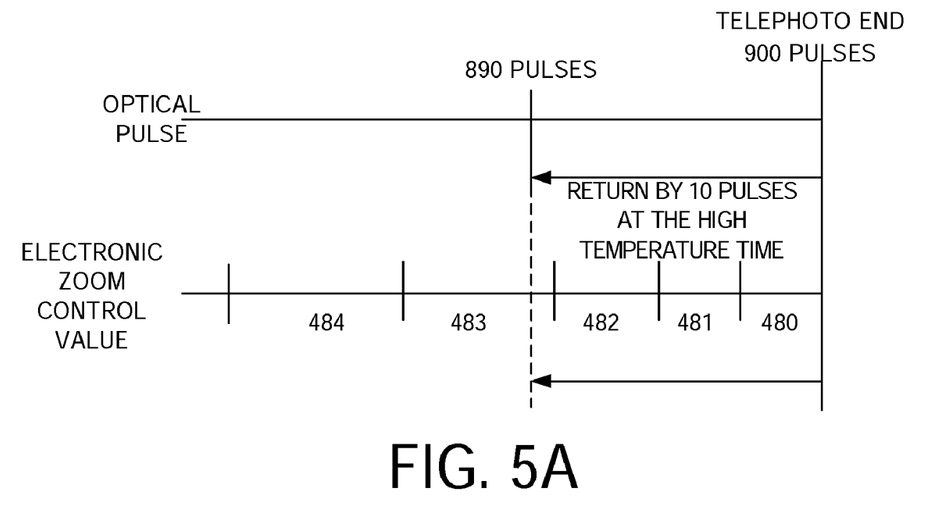
FIG. 5A is a view showing a relationship between a movement of a magnification-varying lens and an electronic zoom control value at the temperature zoom correction time in the video camera of the embodiment.
Figure 5B:
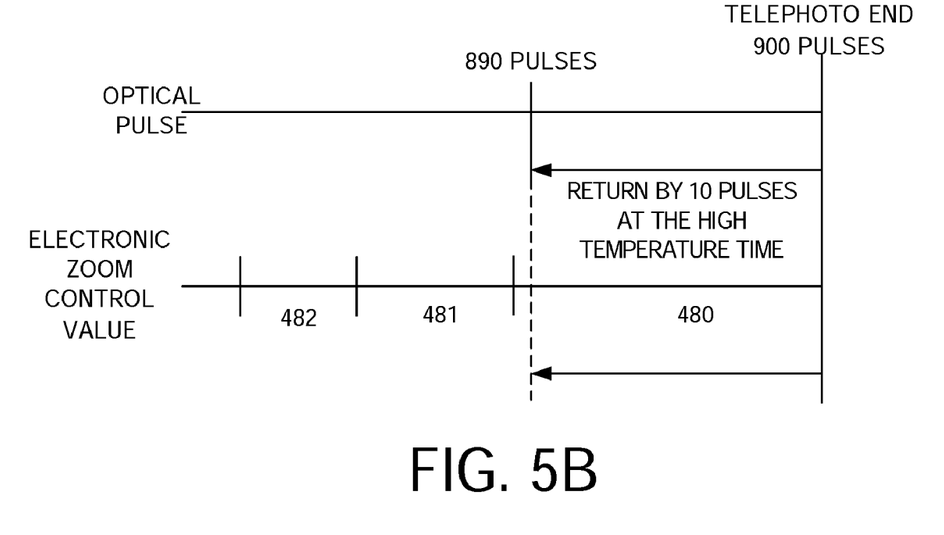
FIG. 5B is a view showing a relationship between a movement of the magnification-varying lens and an electronic zoom control value at the temperature zoom correction time in the video camera of the first embodiment.

FIGS. 5A and 5B are views for explaining the zooming in the video camera of this embodiment at the temperature zoom correction time. In these figures, "890 pulses" indicate the pulse number of the driving signal input to the actuator (stepping motor) 101c so as to drive the magnification-varying lens 101a from the wide-angle end or a predetermined reference position to the optical zoom position E shown in FIG. 3. The telephoto end is a position corresponding to "900 pulses." In addition, control values "480" to "484" correspond to the memory cut line number in the electronic zooming.

When the barrel temperature detected by the temperature sensor 102 is higher than the predetermined value or the high temperature, the magnification-varying lens 101a that has been located at the telephoto end is moved to the wide-angle side by 10 pulses. At this time, in the control shown in FIG. 5A, the memory cut line number is increased from "480" to "483" and the electronic zoom magnification is reduced accordingly. Therefore, a change of the angle of view becomes conspicuous.

On the other hand, according to the video camera shown in FIG. 5B, the memory cut line number does not change from "480." This case is equivalent to no electronic zooming. Even when a higher barrel temperature is detected and the magnification-varying lens 101a is moved by 15 pulses to the wide-angle side, the memory cut line number increases from "480" only to "481." Thus, according to this embodiment, the electronic zoom magnification does not change or changes only a little even when the magnification-varying lens 101a is moved for the temperature zoom correction. Therefore, a change of the angle of view is not conspicuous.

As described above, according to this embodiment, in the video camera that has the optical/electronic synthesis zoom function, the electronic zoom magnification is changed little even when the magnification-varying lens 101a is moved to the wide-angle side for the temperature zoom correction. Therefore, a significant and conspicuous change of the angle of view can be avoided at the temperature zoom correction time.

Second Embodiment

The first embodiment sets a change rate of the electronic zoom magnification in a telephoto-end neighboring zoom region to be smaller than that in the zoom region D-E other than the telephoto-end neighboring zoom region within the telephoto-side zoom region, irrespective of the temperature zooming correction. Alternatively, the change rate of the electronic zoom magnification in the telephoto-end neighboring zoom region may be switched according to whether or not the temperature zooming correction is performed.

Figure 7:
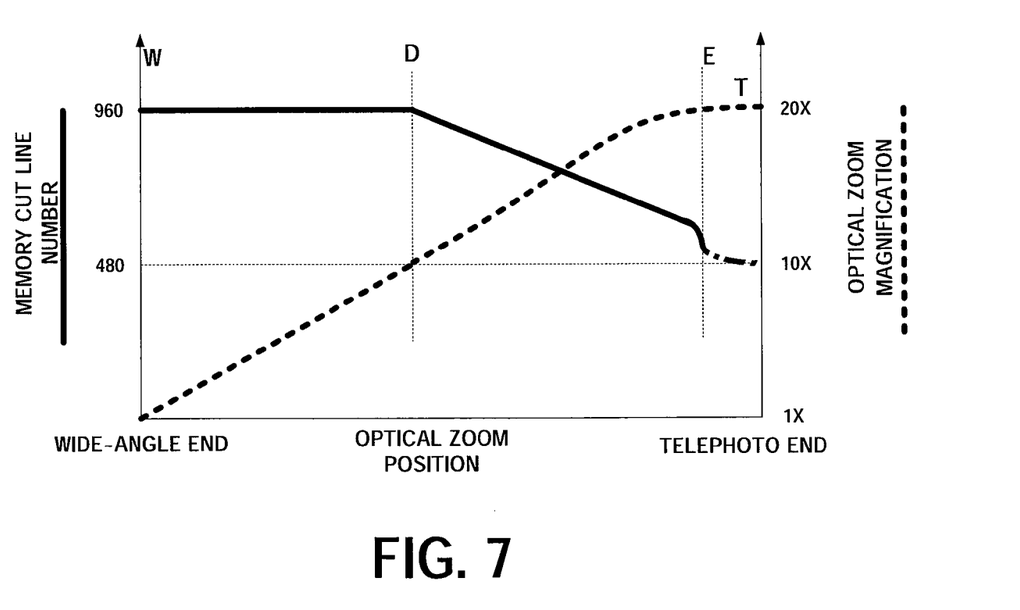
FIG. 7 is a view showing a relationship between an optical zoom magnification and an electronic zoom magnification (or memory cut line number) in a video camera according to a second embodiment of the present invention.

This embodiment will be described with reference to FIG. 7. Similar to FIG. 3, FIG. 7 shows a relationship between the optical zoom magnification and the memory cut line number when the system controller 108 controls zooming.

When the temperature zoom correction is not performed, a change rate of the memory cut line number along with a movement of the magnification-varying lens 101a in the telephoto-end neighboring zoom region is set equal to that in the zoom region D-E, as indicated by a solid line in the figure. On the other hand, when the temperature zoom correction is performed, the change rate of the memory cut line number along with a movement of the magnification-varying lens 101a in the telephoto-end neighboring zoom region is set smaller than that in the zoom region D-E, as shown by an alternated dashed long and short line.

In other words, the change rate of the memory cut line number along with a movement of the magnification-varying lens 101a in the telephoto-end neighboring zoom region is switched so that it can be equal to the change rate of the electronic zoom magnification of the zoom region D-E when there is no temperature zoom correction, and smaller than the change rate of the electronic zoom magnification of the zoom region D-E when there is a temperature zoom correction.

Even in this switching of the change rate of the electronic zoom magnification, the electronic zoom magnification hardly changes even when the magnification-varying lens 101a is moved to the wide-angle side for the temperature zoom correction in the video camera that has the optical/electronic synthesis zooming function. Therefore, a significantly and conspicuously change of the angle of view can be avoided at the temperature zoom correction time.

Since the operational flow of the system controller 108 of this embodiment is basically similar to that of the first embodiment (FIG. 4), a description thereof will be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the above embodiment describes the alternative of whether or not the temperature zoom correction is performed, but the electronic zoom magnification may be gradually decreased as the temperature rises. A deformation (enlargement and reduction) of the barrel along with the temperature rise is a linear deformation, and this configuration accords with its linearity. In this case, the telephoto end of the optical zoom unit is moved to the wide-angle side according to the temperature detected by the temperature detector, and the change rate of the zoom magnification of the electronic zooming unit at the first temperature is made smaller than the change rate of the zoom magnification at the second temperature higher than the first temperature.

While each of the above embodiments describes a video camera, the present invention is applicable to another image pickup apparatus, such as a digital still camera.

This application claims the benefit of Japanese Patent Application No. 2007-338411, filed on Dec. 28, 2007, which is hereby incorporated by reference herein in its entirety.

What is claimed is:

1. An image pickup apparatus comprising:
   an optical zooming unit configured to provide an optical magnification variation;
   an electronic zooming unit configured to provide an electronic magnification variation;

a temperature detector configured to detect a temperature of the image pickup apparatus; and a controller configured to move the electronic zooming unit along with an operation of the optical zooming unit, and to move a telephoto end for control of the optical zooming unit toward a wide-angle side according to the temperature detected by the temperature detector, wherein along with control to move the telephoto end of the optical zooming unit toward the wide-angle side, the controller sets a change rate of a zoom magnification of the electronic zooming unit in a first zoom region that is closer to the telephoto-end than a zoom region in which the electronic zooming is not performed and the optical zooming is performed, wherein the change rate in a second zoom region is smaller than the change rate in a third zoom region, wherein the second zoom region is a zoom region of the telephoto side in the first zoom region, wherein the third zoom region is a zoom region of the wide side in the first zoom region and is a region other than the second region in the first region.

2. An image pickup apparatus according to claim 1, wherein the controller sets a smaller value to the change rate of the zoom magnification for a position closer to the telephoto end.

3. An image pickup apparatus comprising:
an optical zooming unit configured to provide an optical magnification variation;
an electronic zooming unit configured to provide an electronic magnification variation;
a temperature detector configured to detect a temperature of the image pickup apparatus; and
a controller configured to move the electronic zooming unit along with an operation of the optical zooming unit in a first zoom region, and to move a telephoto end for control of the optical zooming unit in a second zoom region in the first zoom region toward a wide-angle side according to a temperature detected by the temperature detector,
wherein the controller sets a zoom magnification of an electronic zooming unit at a first temperature, which operates along with the operation of the optical zooming unit in the second zoom region, to be smaller than a zoom magnification of an electronic zooming unit at a second temperature higher than a first temperature.

4. A control method of an image pickup apparatus that includes an optical zooming unit configured to provide an optical magnification variation, and an electronic zooming unit configured to provide an electronic magnification variation, said control method comprising:
a first step of detecting a temperature of the image pickup apparatus; and
a second step of moving the electronic zooming unit along with an operation of the optical zooming unit in a first zoom region, and of moving a telephoto end for control of the optical zooming unit toward a wide-angle side according to the temperature detected in the first step,
wherein along with control to move the telephoto end of the optical zooming unit toward the wide-angle side, the second step sets a change rate of a zoom magnification of the electronic zooming unit in the first zoom region that is closer to the telephoto-end than a zoom region in which the electronic zooming is not performed and the optical zooming is performed,
wherein the change rate in a second zoom region is smaller than the change rate in a third zoom region,
wherein the second zoom region is a zoom region of the telephoto side in the first zoom region,
wherein the third zoom region is a zoom region of the wide side in the first zoom region and is a region other than the second region in the first region.

5. A control method of an image pickup apparatus that includes an optical zooming unit configured to provide an optical magnification variation, and an electronic zooming unit configured to provide an electronic magnification variation, said control method comprising:
a first step of detecting a temperature of the image pickup apparatus; and
a second step of moving the electronic zooming unit along with an operation of the optical zooming unit in a first zoom region, and of moving a telephoto end for control of the optical zooming unit in a second zoom region in the first zoom region toward a wide-angle side according to the temperature detected in the first step,
wherein the second step sets a zoom magnification of an electronic zooming unit at a first temperature, which operates along with the operation of the optical zooming unit in the second zoom region, to be smaller than a zoom magnification of an electronic zooming unit at a second temperature higher than the first temperature.

* * * * *